3,246,046
DIMERIZATION OF PROPYLENE
James J. Garmon, Hudson, Ohio, assignor to The Goodyear Tire & Rubber Company, Akron, Ohio, a corporation of Ohio
Filed Oct. 3, 1963, Ser. No. 313,636
3 Claims. (Cl. 260—683.15)

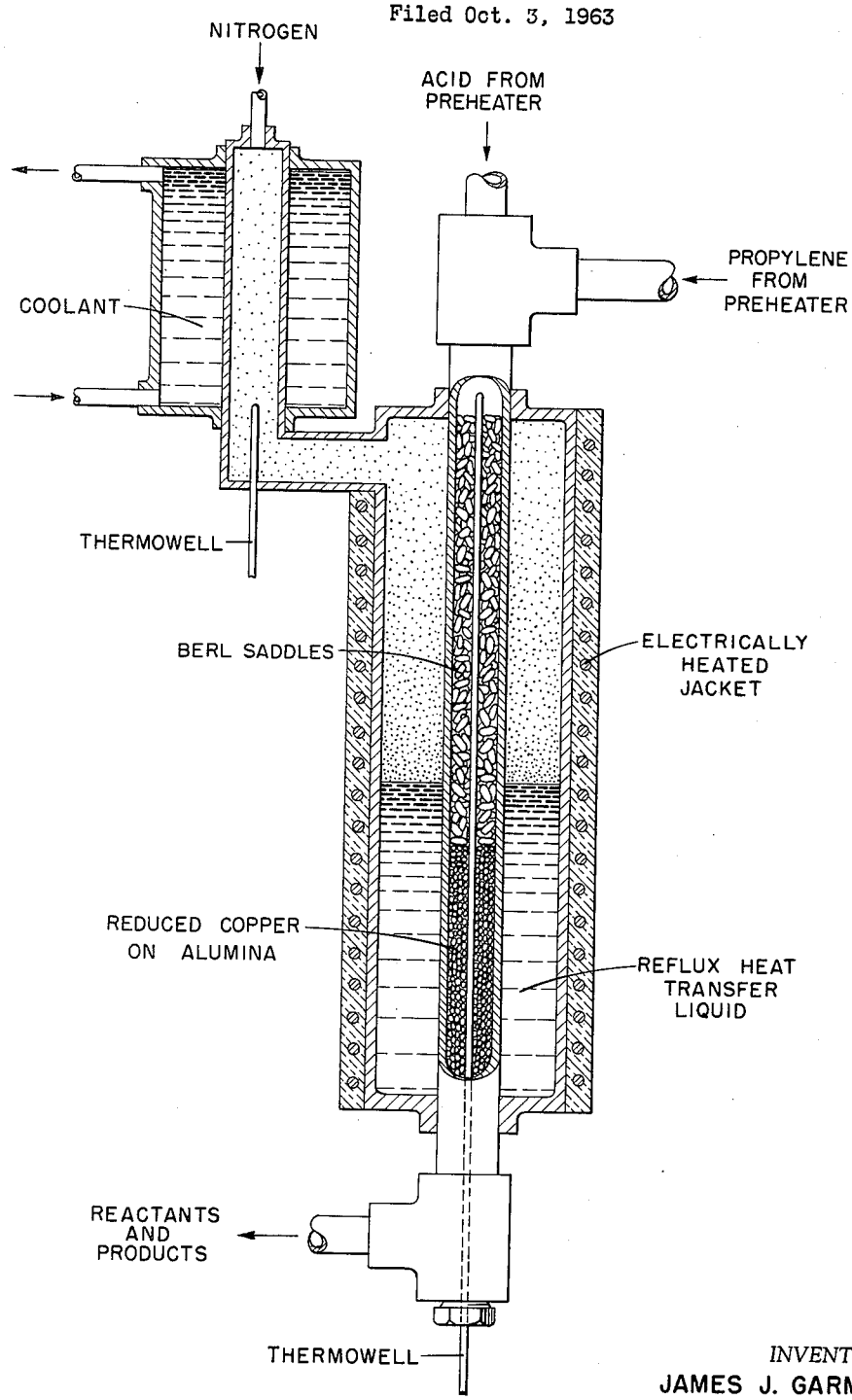

This invention relates to the dimerization of propylene.

More particulary, the invention relates to the selective polymerization of propylene with production of dimers and particularly precursors of isoprene.

Many processes have been developed for the polymerization of propylene using phosphoric acid. The chief objection to the use of this acid has been its corrosive effect on the equipment. Kemp et al. U.S. 2,653,177 points out that the corrosive effect is reduced by using acid concentrations above about 100 percent and recommends the use of small amounts of copper added, preferably in the form of copper phosphate to reduce the corrosion. The use of copper as a catalyst with phosphoric acid for various organic reactions, has been proposed by Bielawski et al. in U.S. 2,618,614. Copper treated with phosphoric acid is used as an hydration catalyst in Cottle et al. 2,810,759. The use of dilute aqueous phosphoric and other acids in the polymerization of propylene is described in Toland U.S. 2,870,217. However, no one has suggested that dilute phosphoric acid in the presence of copper, selectively polymerizes propylene with a high yield of dimers.

The dimerization of this invention is catalyzed by phosphoric acid in the presence of a phosphoric-acid-activated copper surface as a promoter. The process is carried out at pressures between 1000 and 5000 pounds per square inch and preferably 2000 to 3500 pounds per square inch, and temperatures within the approximate range of 150 to 350° C. and preferably 250 to 300° C. Aqueous phosphoric acid with a $H_3PO_4$ content of 0.1 to 5 percent is used. The liquid hourly space velocity or volumes of liquid feed per volume of catalyst per hour (referred to herein as LHSV) of the acid is usually 2 to 25, and preferably about 5 to 15. The LHSV of the propylene is usually about 2 to 50, and preferably 3 to 20.

The process is carried out as a batch process or as a continuous process. The copper may be present in a catalyst bed as copper or CuO, or in other form, or a tubular reactor may be employed in which the copper is present as a liner in the tubing. As the polymerization proceeds such copper is solubilized in the acid. It is therefore advantageous to add copper to the acid either as copper, copper oxide, copper phosphate or other copper salt to inhibit solution of the catalyst.

The invention is further described in connection with the accompanying drawing and examples. The drawing is in the nature of a flow sheet and omits pumps, valves, etc. The examples refer more particularly to laboratory operations.

PREPARATION OF COPPER PROMOTER

One hundred sixty grams of pelletized hard alumina (Houdry Grade 200) were mixed with about 150 cc. of concentrated cupric nitrate solution. The liquid was joured off and pellets dried overnight at 100° C. The pellets were next calcined at 1000° C. for three hours. The CuO formed on the pellets in this manner was then reduced by passing hydrogen over them at temperatures of 280 to 400° C. The reduced promoter contained 16 percent copper.

*Example 1*

Alumina pellets coated with copper reduced as described, were placed in a 25 cc. jacketed reactor measuring ⅜-inch inside diameter. The jacket was electrically heated and contained diethylene glycol which was refluxed under nitrogen pressure to obtain the desired temperature. The copper promoter was activated by passing 37.5 percent aqueous $H_3PO_4$ over it for 15 to 30 minutes at a rate of 3 cc. per minute at a temperature of 300° C.

Propylene and 0.5 percent aqueous phosphoric acid saturated with CuO were pumped through the preheater section of the reactor containing packing elements such as Berl saddles. The lower part of the tube was filled with the pellets coated with reduced copper activated by treatment with phosphoric acid. The Berl saddles (indicated schematically in drawing) occupied 75 cc. of the reactor and the bed of catalyst pellets was 25 cc. deep below this. The diethylene glycol in the jacket was refluxed under 28 p.s.i. (gauge) of nitrogen pressure resulting in a temperature of 240 to 260° C. inside the bed within the reactor. The pressure inside of the reactor was maintained at 3500 p.s.i. The LHSV for the liquid propylene was 12.2 and for the acid was 9.2. From the reactor the stream was passed through a condenser (not shown) and then through a pressure control valve (not shown) and collected in a receiver (not shown). The condensed components of the product stream (propylene and dimer) were trapped in a Dry Ice (frozen carbon dioxide) trap. The organic polymeric material and acid collected in the trap were not miscible and were separated; the polymeric material was washed with water, and dried over potassium carbonate. The polymeric material was distilled and cuts were analyzed by gas chromatography. The material in the trap was allowed to warm and vent off condensed propylene, and the vented gases and polymer remaining behind were also analyzed by gas chromatography. The conversion to polymers was 26.8 percent. The process yielded a substantial amount of dimeric isoprene precursors. The composition of the polymeric material was as follows:

| | Percent |
|---|---|
| Isoprene precursors [1] | 26.9 |
| Other branched hexenes | 10.9 |
| Total branched hexenes | 37.8 |
| Normal hexenes | 4.3 |
| Total hexenes | 42.1 |
| $C_9$ | 12.0 |
| $C_{12}$ and higher | 42.0 |

[1] The precursors obtained were 2-methyl-1-pentene, 2-methyl-2-pentene, 3-methyl-trans-2-pentene and 3-methyl-cis-2-pentene. The 2-methyl-1-pentene is included because it is readily isomerized to 2-methyl-2-pentene.

*Examples 2–7*

Further runs were made in the same or similar equipment. Dilute phosphoric acid was used of different concentrations as summarized in the following table, and in each case copper oxide was disoslved in the phosphoric acid until no more would dissolve. The conditions and yields are summarized in the following table.

| Example No. | 2 | 3 | 4 | 5 | 6 | 7 |
|---|---|---|---|---|---|---|
| $H_3PO_4$ conc., percent | 0.5 | 0.5 | 1.0 | 1.0 | 5.0 | 5.0 |
| Propylene, LHSV | 5.7 | 5.7 | 5.7 | 5.7 | 6.6 | 6.6 |
| Acid, LHSV | 5.7 | 2.3 | 5.7 | 2.3 | 5.7 | 2.3 |
| Temperature, °C | 280–287 | 215 | 280 | 225 | 280–290 | 275–280 |
| Pressure, p.s.i. | 3,500 | 3,500 | 3,500 | 3,500 | 3,500 | 3,500 |
| Conversion, percent | >90 | 61 | 62 | 26 | >90 | 34 |
| Dimer in polymer, percent | 30.2 | 37.2 | 34.7 | 42.0 | 32.5 | 35.8 |
| Isoprene precursors,[1] percent | 18.3 | 22.0 | 20.6 | 27.1 | 20.7 | 20.5 |
| Total hexenes, percent | 33.2 | 39.0 | 35.6 | 45.3 | 34.6 | 35.6 |

[1] These include 2,3-dimethyl-1-butene, 3-methyl-trans-2-pentene, 3-methyl-cis-2-pentene, and 2-methyl-2-pentene.

With the phosphoric-acid-activated copper as a promoter, the yield of dimer with such weak acid is surprisingly high, particularly in view of the short residence times.

What I claim is:

1. In the process of polymerizing propylene and producing a product containing a substantial percentage of dimers which are isoprene precursors, the improvement which comprises catalyzing the polymerization with aqueous copper-salt-saturated phosphoric acid with a content of $H_3PO_4$ between 0.1 and 5 percent, under a pressure of 1000 to 5000 pounds per square inch at a temperature of 200 to 350° C., using a bed of material with a phosphoric-acid-activated copper surface of sufficient area to serve as a promoter.

2. The process of claim 1 in which the promoter is a pellet base coated with copper the surface of which is activated by $H_3PO_4$.

3. In the process of polymerizing propylene and producing a product containing a substantial percentage of dimers which are isoprene precursors, the improvement which comprises catalyzing the polymerization with aqueous copper-salt-saturated phosphoric acid with a content of $H_3PO_4$ between 0.1 and 5 percent in a copper-lined tube under a pressure of 1000 to 5000 pounds per square inch at a temperature of 200 to 350° C.

References Cited by the Examiner

UNITED STATES PATENTS

| 2,210,148 | 8/1940 | Indest | 260—683.15 |
| 2,300,123 | 10/1942 | Keunecke et al. | 260—683.15 |
| 2,870,217 | 1/1959 | Toland | 260—683.15 |

DELBERT E. GANTZ, *Primary Examiner.*

R. H. SHUBERT, *Assistant Examiner.*